United States Patent [19]

Zacuto

[11] Patent Number: 4,606,399

[45] Date of Patent: Aug. 19, 1986

[54] HEAT RECOVERY SYSTEM WITH COMBUSTION GAS ACCELERATOR

[75] Inventor: Philip Zacuto, Winchester, Mass.

[73] Assignee: Heat Extractor, Inc., Melrose, Mass.

[21] Appl. No.: 755,816

[22] Filed: Jul. 17, 1985

[51] Int. Cl.$^4$ .............................................. F23L 15/02
[52] U.S. Cl. ......................................... 165/4; 237/50;
237/53; 165/908; 126/307 R
[58] Field of Search ............................ 237/55, 50, 53;
126/99 R, 101, 307 R; 165/4, 7, 908

[56] References Cited

U.S. PATENT DOCUMENTS 3,813,039 5/1974 Wells ..................................... 237/55

*Primary Examiner*—Henry Bennett

*Attorney, Agent, or Firm*—Thompson, Birch, Gauthier & Samuels

[57] ABSTRACT

A system is disclosed for recovering heat from high temperature combustion gases escaping from a heater such as for examples a domestic warm air furnace, boiler or the like. The system includes a first conduit leading to a chimney and a second conduit leading to a heat recovery unit which in turn is connected to a vent. A "T" connection interconnects the first and second conduits to each other and to the heater. The heat recovery unit artificially induces a draft in the second conduit which overcomes the natural draft induced in the first conduit by virtue of its connection to the chimney. An accelerator in the T connection increases the velocity of combustion gases flowing past the first conduit into the second conduit.

4 Claims, 2 Drawing Figures

HEAT RECOVERY SYSTEM WITH COMBUSTION GAS ACCELERATOR

BACKGROUND OF THE INVENTION

1. Field of the Invention

This invention relates to systems for recovering heat from high temperature combustion gases.

2. Description of the Prior Art

A system for recovering heat from high temperature combustion gases is disclosed in U.S. patent application Ser. No. 380,606 filed May 21, 1982 now U.S. Pat. No. 4,497,439. In this system, combustion gases may flow through either a first conduit leading to a conventional chimney, or a second conduit leading to a heat recovery unit which in turn is connected to a vent. The first and second conduits are interconnected to each other and to the source of combustion gases by a common "T" connection, and a draft is artificially induced in the second conduit to overcome the natural chimney draft and thereby divert the flow of combustion gases through the heat recovery unit and out through the vent. Should the means for artificially inducing the draft in the second conduit become inoperative, the combustion gases automatically divert to the first conduit leading to the chimney as a result of the natural draft present therein. However, under extreme conditions, where for example the chimney is subjected to usually high winds, the natural chimney draft may become strong enough to overcome the artificially induced draft, with the result that the high temperature gases will bypass the second conduit leading to the heat recovery unit and continue along the first conduit to the chimney. This results in a loss of valuable energy.

SUMMARY OF THE PRESENT INVENTION

The basic objective of the present invention is to avoid the above-described bypass problem by providing a gas accelerator in the T connection between the first and second conduits. The accelerator increases the velocity of the combustion gases flowing past the first conduit into the second conduit. This increase in velocity, when combined with the artificially induced draft in the second conduit, is sufficient to overcome the natural chimney draft, even in extreme and unusual situations. However, if the means for inducing the artificial draft in the second conduit becomes inoperative, the aforesaid increase in velocity will be insufficient by itself to overcome the natural chimney draft, with the result that the gases will still divert to and be exhausted safely through the first conduit and the chimney.

Preferably, the accelerator comprises a tapered third conduit located within the T connection, with an inlet at one end through which the combustion gases enter from the heater, and with a smaller outlet at the opposite end through which the combustion gases exit into the second conduit.

Ideally, the first and second conduits have circular cross sections, and the third conduit consists of a hollow truncated cone.

Preferably, the first conduit extends laterally with respect to the third conduit, and the outlet of the third conduit is located approximately at the center line of the first conduit.

These and other objects, features and advantages of the present invention will be described in more detail with reference to the accompanying drawings, wherein:

DETAILED DESCRIPTION OF ILLUSTRATED EMBODIMENT

Figure 1:
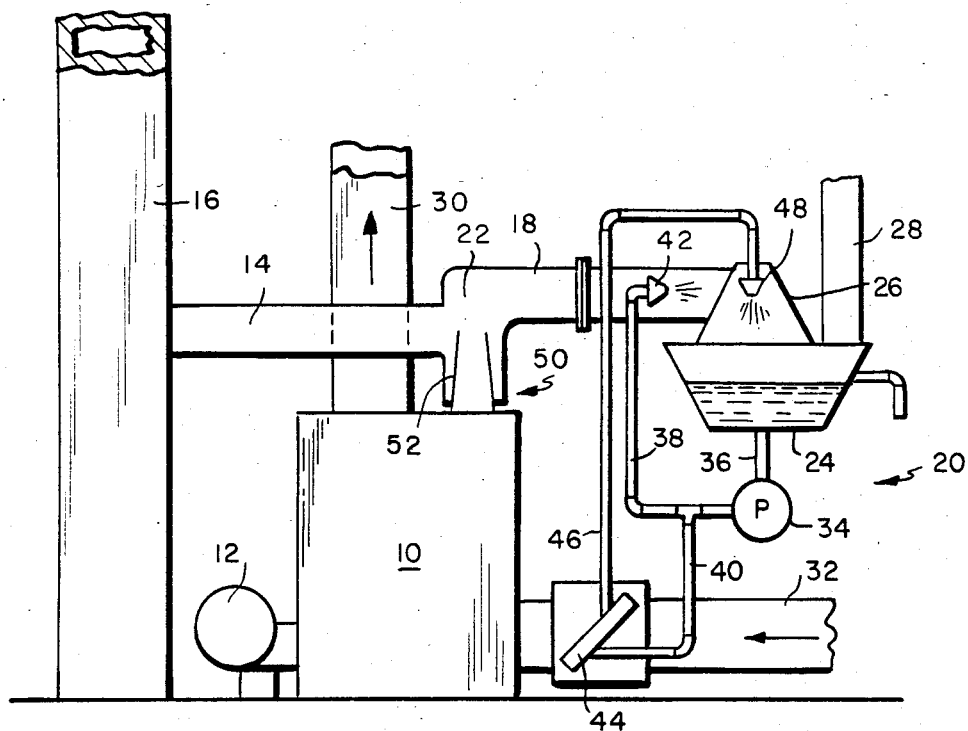
FIG. 1 is a diagramatic representation of a heat recovery system incorporating an accelerator in accordance with the present invention.

Referring initially to FIG. 1, a conventional heater, such as for example a domestic warm air furnace, is shown at 10. The furnace may be fired by any conventional means, including for example an oil or gas burner 12. A first combustion gas conduit 14 connects to furnace to a chimney 16. A second combustion gas conduit 18 leads to a heat recovery unit generally indicated at 20. The first and second conduits 14, 18 are interconnected to each other and to the furnace 10 by means of a common "T" connection 22.

The heat recovery unit 20 includes a sump 24 containing water. The second conduit 18 leads to a hood 26 overlying and in communication with the sump. A vent 28 extends from the sump 24 to a remote outlet (not shown).

The furnace has an outlet air duct 30 which carries heated air to the rooms to be heated, and a return air duct 32 through which room air is brough back for reheating.

The first combustion gas conduit 14 has natural draft induced therein by virtue of its connection to the chimney 16. The heating recovery unit 20 has means associated therewith for inducing a draft in the second conduit 18. The said means includes a water pump 34 connected to the sump 24 by suction line 36. The pump discharge line branches into lines 38, 40. Line 38 leads to a first nozzle assembly 42 in conduit 18, and line 40 leads to a heat exchanger 44 in the return air duct 32. The heat exchanger 44 is in turn connected in a line 46 to a second nozzle assembly 48 in the hood 26.

The nozzle assemblies 42, 48 operate to artificially induce a draft in conduit 18, thereby diverting combustion gases from conduit 14 through the conduit 18, the hood 26 and sump 24, and finally out through the vent 28. The water sprayed by nozzle assemblies 42, 48 is heated by the combustion gases before being collected in the sump 24. As that heated water is thereafter circulated through the heat exchanger 44, it gives up heat to the air being returned through duct 32 to the furnace. By preheating the return air in this manner, important cost savings are realized. If the pump 34 becomes inoperative, the artificially induced draft in conduit 18 will cease to exist, in which event the natural chimney draft will take over, causing combustion gases to be exhausted via conduit 14 to the chimney.

Figure 2:
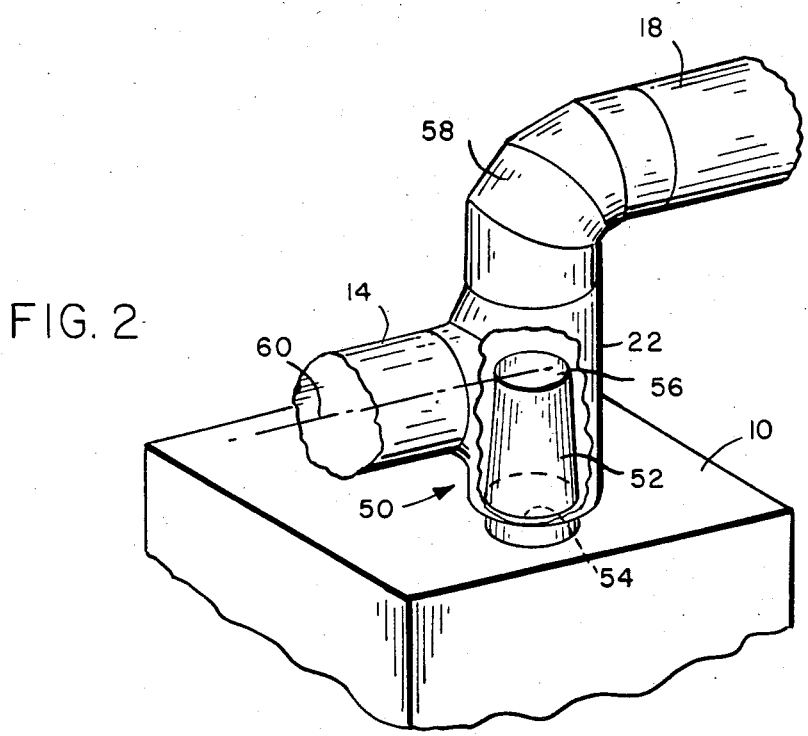
FIG. 2 is an enlarged partial perspective view, with portions broken away, of the system shown in FIG. 1.

As mentioned previously, under unusual conditions, the natural chimney draft may become strong enough to overcome the artificially induced draft in conduct 18, thereby causing the combustion gases to bypass the heat recovery unit 20. In order to prevent this from happening, a gas accelerator 50 is arranged in the T connection 22. As can be best seen in FIG. 2, the accelerator comprises a tapered third conduit 52, preferably consisting of a hollow truncated cone. The third conduit has its enlarged inlet end 54 arranged to receive the combustion gases from the furnace 10, and its smaller or restricted outlet end 56 arranged to discharge combustion gases into an elbow 58 forming part of the second conduit 18. As the combustion gases pass through the accelerator, they experience an increase in velocity which when combined with the artificially induced draft in conduit 18, is sufficient to overcome the chimney draft, even in the most extreme and severe conditions. However, in the event of an interruption of the artificially induced draft, the natural chimney draft will be more than enough to overcome the effects of velocity increase in accelerator 50, thus insuring that the combustion gases automatically divert to and continue to be exhausted safely through conduit 14 and chimney 16.

Preferably, the outlet end 56 of the third conduit 52 is located approximately on the center line 60 of the first conduit 14.

I claim:

1. A system for recovering heat from high temperature combustion gases generated by a heater such as for example a warm air furnace, boiler or the like, said system comprising: a first conduit leading to a chimney, a second conduit leading to a heat recovery unit which in turn is connected to a vent; a T connection interconnecting said first and second conduits to each other and to the heater, the first conduit having a natural draft induced therein by virtue of its connection to the chimney; means associated with the heat recovery unit for artificially inducing a draft in the second conduit to overcome the natural draft in the first conduit and to thereby divert combustion gases from the first conduit through the second conduit, the heat recovery unit and the vent; and accelerator means for increasing the velocity of the combustion gases flowing past the first conduit into the second conduit, said accelerator means comprising a tapered third conduit having an inlet end which is larger than its outlet end, said third conduit being located within said T connection with said inlet end arranged to receive combustion gases from said heater and with said outlet end arranged to direct said combustion gases past said first conduit and into said second conduit.

2. The system of claim 1 wherein the first conduit extends laterally with respect to the flow path of combustion gases through the third conduit.

3. The system of claim 1 wherein the third conduit consists of a hollow truncated cone.

4. The system of either of claims 1, 2 or 3 wherein the outlet of the third conduit is located approximately at the center line of the first conduit.

* * * * *